United States Patent
Sato et al.

(10) Patent No.: US 9,054,391 B2
(45) Date of Patent: *Jun. 9, 2015

(54) LITHIUM ION SECONDARY BATTERY AND METHOD FOR PRODUCING SAME

(75) Inventors: Hiroshi Sato, Niigata (JP); Hiroshi Sasagawa, Niigata (JP); Megumi Fujii, Niigata (JP); Rieko Kato, Niigata (JP); Takayuki Fujita, Niigata (JP)

(73) Assignee: Namics Corporation, Niigata (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/637,745

(22) PCT Filed: Mar. 22, 2011

(86) PCT No.: PCT/JP2011/056765
§ 371 (c)(1),
(2), (4) Date: Sep. 27, 2012

(87) PCT Pub. No.: WO2011/125481
PCT Pub. Date: Oct. 13, 2011

(65) Prior Publication Data
US 2013/0017454 A1 Jan. 17, 2013

(30) Foreign Application Priority Data
Mar. 31, 2010 (JP) ................................. 2010-081202

(51) Int. Cl.
*H01M 10/0525* (2010.01)
*H01M 4/131* (2010.01)
(Continued)

(52) U.S. Cl.
CPC ...... *H01M 10/0525* (2013.01); *Y10T 29/49112* (2015.01); *H01M 4/131* (2013.01);
(Continued)

(58) Field of Classification Search
None
See application file for complete search history.

(56) References Cited

U.S. PATENT DOCUMENTS 8,309,257 B2 * 11/2012 Kanamura et al. ............ 429/304
2009/0226790 A1 * 9/2009 Kanamura et al. ............ 429/30
(Continued)

FOREIGN PATENT DOCUMENTS

CN 101622749 1/2010
CN 101663788 3/2010
(Continued)

OTHER PUBLICATIONS

Yoshio et al. "Lithium-Ion Batteries. Science and Technologies", 2009 Springer ISBN: 978-0-387-34444-7, e-ISBN: 978-0-387-34445-4, DOI: 10.1007/978-0-387-34445-4.*
(Continued)

*Primary Examiner* — Carlos Barcena
*Assistant Examiner* — Wojciech Haske
(74) *Attorney, Agent, or Firm* — Jordan and Hamburg LLP (57) ABSTRACT

Disclosed is a lithium ion secondary battery that has a simple structure, is easily produced, and wherein short circuits do not arise. The lithium ion secondary battery comprises an active material being contained in a matrix comprising a laminated body that includes a positive current collector and a negative current collector which are laminated on each other via a solid electrolyte layer, the solid electrolyte layer includes an active material in a matrix made of solid electrolyte, and a ratio of the volume of the solid electrolyte and the volume of the active material being 90:10-65:35. Also, the active material may also be contained in a matrix of a conductive substance of the positive current collector and/or the negative current collector.

7 Claims, 4 Drawing Sheets

(51) Int. Cl.
  *H01M 10/0562* (2010.01)
  *H01M 10/0585* (2010.01)
  *H01M 4/485* (2010.01)
  *H01M 4/505* (2010.01)

(52) U.S. Cl.
  CPC .............. *H01M 4/485* (2013.01); *H01M 4/505* (2013.01); *H01M 10/0562* (2013.01); *H01M 10/0585* (2013.01); *Y02E 60/122* (2013.01); *Y02T 10/7011* (2013.01)

(56) References Cited

U.S. PATENT DOCUMENTS

2010/0003592 A1　　1/2010　Baba et al.
2010/0075219 A1 *　3/2010　Iwaya et al. .................. 429/158

FOREIGN PATENT DOCUMENTS

| JP | 4-026073 | 1/1992 |
| JP | 2001-126758 | 5/2001 |
| JP | 2007-258165 | 10/2007 |
| JP | WO-2008099508 A1 * | 8/2008 |
| JP | 2009-123389 | 6/2009 |

OTHER PUBLICATIONS

Chinese Office Action issued on Feb. 16, 2015 which corresponds to Chinese Patent Application No. 201180017913.9.

* cited by examiner

FIG. 1

FIG. 2
● ACTIVE MATERIAL RATIO vs DISCHARGE CAPACITY AT THE THIRD CYCLE

FIG. 3
● CYCLE CHARACTERISTIC (UP TO 10 CYCLES) Li2MnO3

FIG. 4
● CYCLE CHARACTERISTIC (UP TO 10 CYCLES) - INTERNAL RESISTANCE (Li2MnO3)

LITHIUM ION SECONDARY BATTERY AND METHOD FOR PRODUCING SAME

TECHNICAL FIELD

The present invention relates to a lithium ion secondary battery and a method of producing the same. In particular, the present invention relates to a lithium ion secondary battery that has a simple structure and can be easily produced, and a method of producing the same.

BACKGROUND ART

With outstanding advancement of electronics technology in recent years, portable electronic devices have been made smaller, lighter, and thinner, and equipped with multiple functions. According to this, batteries as power sources for electronic devices are required to be smaller, lighter, thinner, and highly reliable. In response to the demand, a generally-proposed multilayer lithium ion secondary battery has a plurality of positive layers and a plurality of negative layers, which are laminated on each other via an electrolyte layer.

The multilayer lithium ion secondary battery is assembled by laminating battery cells with the thickness of several tens of μm. Therefore, the battery can be readily made smaller, lighter, and thinner. An all-solid lithium ion secondary battery includes solid electrolyte instead of electrolytic solution. Therefore, the all-solid lithium ion secondary battery is immune to leakage or depletion of liquid and has high reliability. Furthermore, because the all-solid lithium ion secondary battery includes lithium, the all-solid lithium ion secondary battery provides high voltage and high energy density.

Figure 6:
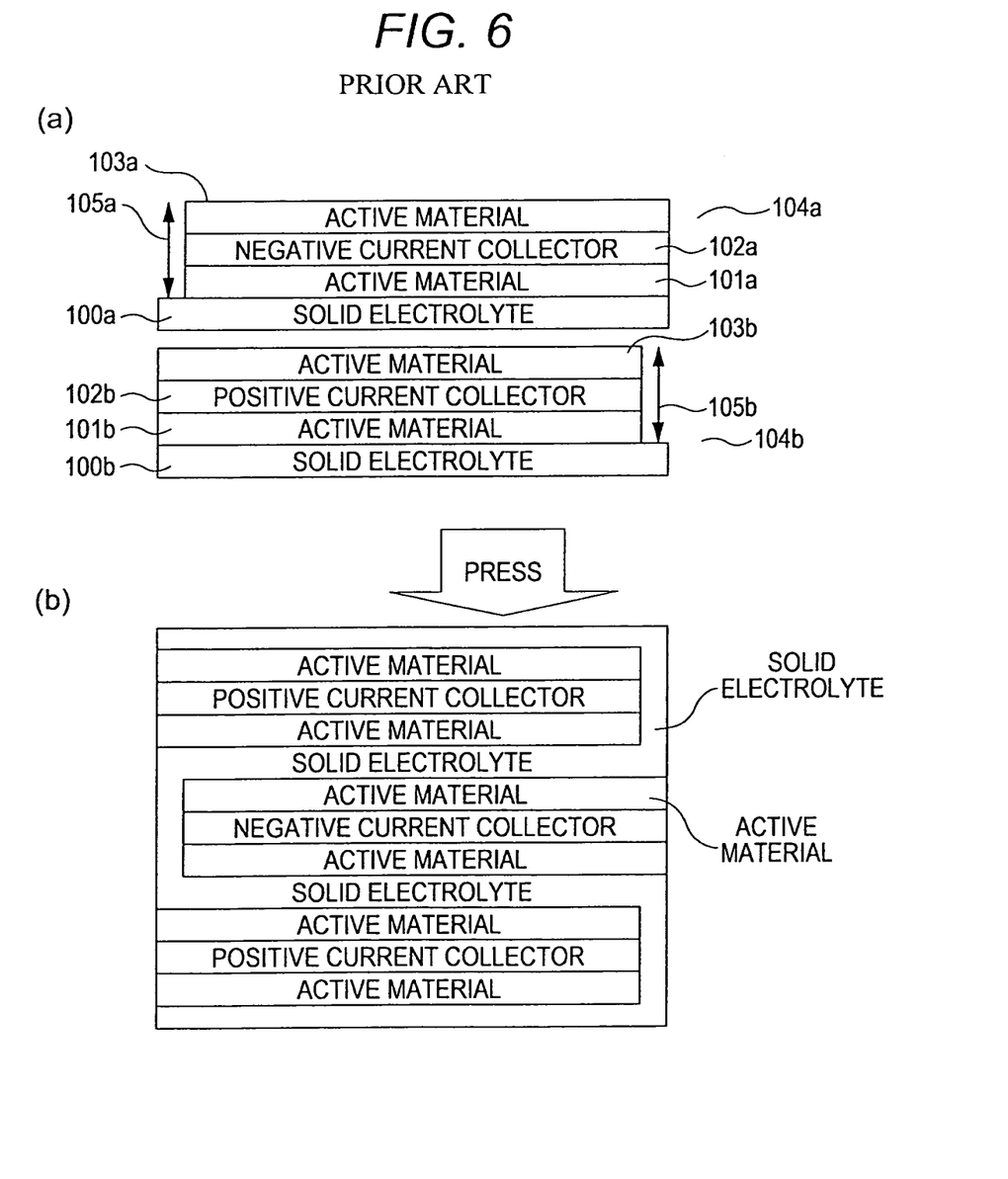
FIG. 6. is a conceptual diagram illustrating a structure of a conventional battery.

As illustrated in FIG. 6, an all-solid lithium ion battery that includes an inorganic solid electrolyte for an electrolyte layer is produced by forming a laminated body by laminating a positive active material layer and a negative active material layer one by one with an electrolyte layer interposed therebetween.

For example, a negative unit is produced by printing a negative active material 101a, a negative current collector 102a, and a negative active material 103a onto a solid electrolyte 100a formed on a substrate made of PET for example. Similarly to the negative unit 104a, a positive unit 104b is produced by printing a positive active material 101b, a positive current collector 102b, and a positive active material 103b onto solid electrolyte 100b formed on a substrate made of PET for example.

At this time, in the negative unit 104a, a step 105a is provided at the left side of the drawing. On the other hand, in the positive unit 104b, a step 105b is provided at the right side of the drawing. By providing such steps, extraction from a current collector of the same pole can be done at once.

However, in the structure illustrated in FIG. 6, printing needs to be done three times only to produce the negative unit 104a. Besides, a base sheet is spoiled every time printing is done (called "sheet attack"). In addition, the step 105a has the thickness equivalent to the thickness of three layers of the active material 101a, the negative current collector 102a, and the active material 103a. The size of the step 105a has been a restriction on design or process.

With respect to the structure illustrated in FIG. 6, Patent Document 1 discloses a technology to further simplify the structure, and facilitate production.

That is, the technology disclosed in Patent Document 1 discloses an all-solid secondary battery having: a single active material layer made of a single layer including an active material; a positive current collecting electrode provided on one surface of the single active material layer; and a negative current collecting electrode provided on the other surface of the single active material layer. Here, the active material is capable of a plurality of valence fluctuations, and has different redox potentials, which correspond to each valence fluctuation.

This technology is a technology employing a single active material layer formed by a single layer including an active material that can be either a positive electrode or a negative electrode, instead of an inner electrode having a three-layer structure (positive active material layer, electrolyte layer, and negative active material layer) as illustrated in FIG. 6. Patent Document 1 also discloses a case where solid electrolyte is further included in a single active material layer.

The technology disclosed in Patent Document 1 defines three layers of a positive current collecting electrode, a negative current collecting electrode, and a single active material layer as one unit. Therefore, its structure is simple and production is easy.

However, once a secondary battery was implemented by using this technology, it was found that a short circuit occurs.

PRIOR ART DOCUMENT

Patent Document

Patent document 1: JP-A-2009-123389

SUMMARY OF THE INVENTION

An object of the present invention is to provide a lithium ion secondary battery that has a simple structure, is easily produced, and causes no short circuit, and also provide a method of producing the same.

A lithium ion secondary battery according to a first aspect of the present invention includes a laminated body including a positive current collector and a negative current collector alternately laminated on each other via a solid electrolyte layer, wherein the solid electrolyte layer includes an active material in a matrix made of solid electrolyte, and the active material is discontinuous between the positive current collector and the negative current collector.

A lithium ion secondary battery according to a second aspect of the present invention includes a laminated body including a positive current collector and a negative current collector laminated on each other via a solid electrolyte layer, wherein the solid electrolyte layer includes an active material in a matrix made of solid electrolyte, and a ratio of an area of the solid electrolyte to an area of the active material in a cross-section of the solid electrolyte layer is 90:10 to 65:35.

A lithium ion secondary battery according to a third aspect of the present invention is one according to the first or second aspect, wherein the positive current collector and/or the negative current collector includes an active material in a matrix of a conductive material.

If the positive current collector and/or the negative current collector includes an active material in a matrix of a conductive material, junction with a solid electrolyte layer is preferable. Therefore, a lithium ion secondary battery with a low internal resistance and a high capacity can be obtained. The area ratio of the active material and the conductive material in a cross-section of the positive current collector and/or the negative current collector is preferably in a range of 20:80 to 35:65 in order to obtain a high capacity.

A lithium ion secondary battery according to a fourth aspect of the present invention is one according to any one of the first to third aspects, wherein the active material is at least any one of lithium manganese composite oxide, lithium nickel composite oxide, lithium cobalt composite oxide, lithium vanadium composite oxide, and lithium titanium composite oxide.

A lithium ion secondary battery according to a fifth aspect of the present invention is one according to any one of the first to fourth aspects, wherein the solid electrolyte layer is free of a reaction product between the solid electrolyte and the active material.

The solid electrolyte and the active material react with each other upon sintering depending on a combination of materials. A reaction product is generated at an interface between the solid electrolyte and the active material due to reaction. Unlike a reaction product between the active material and the conductive material, it has been ascertained that a reaction product between the solid electrolyte and the active material increases an interface resistance. Therefore, it is preferable to select a combination so that the solid electrolyte and the active material do not react with each other.

In addition, even when the combination is the one that encourages a reaction, a reaction can be suppressed if the sintering temperature is in a range of 500° C. to 600° C. Even if the temperature is in a range of 500° C. to 600° C., sintering is performed satisfactorily. In the present invention, the thickness of the solid electrolyte layer or the current collector layer can be made thinner, which is assumed to give an influence.

A lithium ion secondary battery according to a sixth aspect is one according to any one of the first to fifth aspects, wherein the solid electrolyte is at least one material selected from the group consisting of lithium silicophosphate ($Li_{3.5}Si_{0.5}P_{0.5}O_4$), lithium titanium phosphate ($LiTi_2(PO_4)_2$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B_2O_3$, and $Li_2O$—$GeO_2$.

A lithium ion secondary battery according to a seventh aspect of the present invention is one according to any one of the first to fifth aspects, wherein the solid electrolyte is polyanion oxide including lithium oxide or lithium, except for a polyvalent transition element.

If such an active material or solid electrolyte is used, it is possible to obtain a secondary battery that does not cause a short circuit and has a low impedance and a high discharge capacity.

A lithium ion secondary battery according to an eighth aspect of the present invention is one according to any one of the first to seventh aspects, wherein the solid electrolyte layer is free of a reaction product between the solid electrolyte and the active material.

A reaction product between the solid electrolyte and the active material may increase an interface resistance depending on a product. Therefore, by making an interface without a reaction product, an increase in an interface resistance can be prevented.

A lithium ion secondary battery according to a ninth aspect of the present invention is one according to any one of the first to eighth aspects, wherein the positive current collector and the negative current collector have a thickness of 0.2 µm to 30 µm.

A secondary battery according to the present invention has a three-layer structure of a positive current collector, a solid electrolyte layer, and a negative current collector as the smallest unit. Therefore, the size of a step formed in production of a battery depends on the layer thickness of the current collector.

If the thickness is less than 0.2 µm, the current collector is cut in the sintering process, which leads to a reduction of an effective battery area and a reduction of a battery capacity.

If the thickness exceeds 30 µm, density unevenness occurs between inside of the laminated body and the step, which leads to occurrence of cracking or peeling and a reduction in yield.

A method of producing a lithium ion secondary battery according to a tenth aspect of the present invention includes preparing a solid electrolyte sheet including an active material in a solid electrolyte material; laminating a positive current collector and a negative current collector on each other via the solid electrolyte sheet; followed by sintering, wherein an amount of the active material contained is an amount to be discontinuous between the positive current collector and the negative current collector after the sintering.

A method of producing a lithium ion secondary battery according to an eleventh aspect of the present invention is one according to the tenth aspect, wherein a volume ratio of the solid electrolyte material to the active material is 90:10 to 65:35.

A method of producing a lithium ion secondary battery according to a twelfth aspect of the present invention is one according to the tenth or eleventh aspect, wherein the sintering is performed at a temperature of 500 to 1100° C. for 1 to 240 minutes.

A method of producing a lithium ion secondary battery according to a thirteenth aspect of the present invention is one according to the twelfth aspect, wherein the sintering is performed at a temperature of 500 to 600° C.

A method of producing a lithium ion secondary battery according to a fourteenth aspect of the present invention is one according to any one of the tenth to thirteenth aspects, wherein a heating rate to the temperature is 1 to 50° C./min.

The inventors searched for a cause of short circuits with respect to the technology described in Patent Document 1.

The technology described in Patent Document 1 is based on a structure in which positive and negative current collecting electrodes are provided on a single active material layer made of an active material. The active material continues between the positive current collecting electrode and the negative current collecting electrode, and these electrodes are electrically connected with each other. Even when solid electrolyte is added into the active material layer, the active material becomes a mother phase, and the solid electrolyte is included therein. For this reason, the active material continuously exists between the electrodes, and these electrodes are electrically connected with each other. Actually, referring to [0070] (Embodiment 1) of Patent Document 1, an electrode is made of powder, which is made by mixing an active material ($Li_3V_2(PO_4)_3$, density 3.23 g/cm$^3$) and solid electrolyte ($Li_{1.5}Al_{0.5}Ge_{1.5}(PO_4)_3$, density 3.46 g/cm$^3$) to be the mass ratio of 1:1. When this mass ratio is converted into the volume ratio, the volume ratio becomes 51.7:48.3. In addition, an active material continues between the positive current collector and the negative current collector, and electrically connects these collectors. For this reason, a high electron conductive material cannot be used for an active material. Accordingly, this battery has a high impedance.

The inventors conducted an experiment, in which the additive amount of an active material was changed with solid electrolyte used as a mother phase, on the assumption that short circuits occurred due to the continuity of the active material between the positive and negative current collectors.

As a result, short circuits drastically reduced at a critical value.

That is, when the ratio between the matrix (mother phase) made of solid electrolyte and an active material was 65:35 or more in the area ratio (volume ratio) of the battery cross section, short circuits significantly reduced.

The cross section in this case was observed, and it was found that the active material was not connecting the positive current collector and the negative current collector, and the electrodes were not connected with each other via the active material.

The present invention has been made based on the above findings.

In the present invention, an active material does not continue between a positive current collector and a negative current collector, and does not electrically connect the electrodes with each other. For this reason, an active material having a high electron conductivity can be used (as well as an active material having a low electron conductivity). Therefore, an all-solid battery of the present invention has a low impedance. In addition, because the active material of the positive current collector and the active material of the negative current collector always have solid electrolyte therebetween, an all-solid battery having high reliability can be obtained at a good yield.

According to the present invention, the following advantageous effects are given.

A lithium ion secondary battery that has a simple structure, is easily produced, and causes no short circuit can be provided.

An active material of a positive current collector and an active material of a negative current collector have solid electrolyte therebetween. For this reason, an all-solid battery having high reliability can be obtained at a good yield.

The contact surface between the active material and the solid electrolyte, which are different materials from each other, can be made larger. Accordingly, peeling and cracking can be suppressed, and it is effective in reduction of an interface resistance and improvement of battery characteristics.

The solid electrolyte can be thinned, and it is effective in reduction of impedance and improvement of battery characteristics.

Because the step can be made smaller, production can be made without any structural difficulty. That is, when the step is large, density unevenness occurs between the inside of the laminated body and the step, and cracking or peeling occurs for example. However, according to the present invention, as the step is small, peeling or cracking can be suppressed for example. For this reason, it is effective in reduction of an interface resistance and improvement of battery characteristics.

In addition, the number of printings can be reduced, and sheet attack, which may occur during printing, is suppressed. Accordingly, there is a significant effect in improvement of a battery yield, and in reduction of process cost.

DESCRIPTION OF REFERENCE SIGNS

1 Positive layer
2 Negative layer
3 Solid electrolyte layer
4 Active material
5 Solid electrolyte sheet
6 Positive unit (positive sheet)
7 Negative unit (negative sheet)
9 Negative current collector
10 and 11 Step

DESCRIPTION OF THE PREFERRED EMBODIMENTS

Hereinafter, modes for carrying out the present invention will be described by every constituent element.

The present invention includes a laminated body in which positive current collectors and negative current collectors are alternately laminated with solid electrolyte layers interposed therebetween. The solid electrolyte layer includes an active material in a matrix made of solid electrolyte. In addition, the active material is made discontinuous between the positive current collector and the negative current collector.

To make the active material discontinuous between the positive current collector and the negative current collector, the additive ratio of the active material to the solid electrolyte layer should be 65:35 or less in the volume ratio of the solid electrolyte to the active material.

When producing mixed powder of solid electrolyte power and active material powder, the volume ratio of 65:35 or less will allow the volume ratio to be kept in the solid electrolyte layer after sintering. Therefore, the volume ratio of the solid electrolyte to the active material can be easily adjusted at the time of mixing raw materials.

Incidentally, a discharge capacity starts increasing as the active material is added. For example, when the volume ratio of the solid electrolyte to the active material is 90:10, a discharge capacity higher than that of Patent Document 1 is already obtained. Note that this value is obtained when the current value is 0.3 μA.

(Material for Solid Electrolyte)

As solid electrolyte that constitutes a solid electrolyte layer of the lithium ion secondary battery of the present invention, it is preferable to employ a material with low electron conductivity and high lithium ion conductivity. In addition, an inorganic material that can be sintered in the atmosphere is preferable. For example, it is preferable to employ at least one material selected from the group consisting of lithium silicophosphate ($Li_{3.5}Si_{0.5}P_{0.5}O_4$), lithium titanium phosphate ($LiTi_2(PO_4)_2$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B$—$_2O_3$, and $Li_2O$—$GeO_2$. Furthermore, a material obtained by doping, for example, a different element, $Li_3PO_4$, $LiPO_3$, $Li_4SiO_4$, $Li_2SiO_3$, or $LiBO_2$ to any of these materials may be used. Alternatively, lithium oxide, lanthanum oxide, or titanium oxide may be used. Alternatively, polyanion oxide that includes lithium but is free of a polyvalent transition element may be used. In addition, the material for the solid electrolyte layer may be a crystalline material, an amorphous material, or a glass material.

(Material for Active Material)

As an active material in the present invention, an active material that has functions of both a positive active material and a negative active material is desirable. Requisites for having such functions include the following (a) to (e). That is, (a) the active material includes lithium in its structure; (b) the active material has a lithium ion dispersing path in its structure; (c) the active material has a site for absorbing lithium ions in its structure; (d) the average valence of a base metal element constituting the active material can be higher or lower than a valence on synthesis of the active material; and (e) the active material has moderate electron conductivity. An active material that satisfies requisites (a) to (e) is particularly preferable for an active material used in the present invention.

Specific examples of a preferable active material in the present invention include, for example, lithium manganese composite oxide such as $Li_2MnO_3$ and $LiMn_2O_4$, which have both of lithium ion release capability and lithium ion absorption capability, and a material having a spinel type crystal structure such as $LiV_2O_4$.

In addition, it is needless to say that the present invention is not limited to these materials, but even if it is an active material in which a part of Mn or V is replaced with another transition metal element, the requisites (a) to (e) are satisfied, and it may be adequately used as an active material of the lithium ion secondary battery of the present invention. Furthermore, in order to produce an all-solid battery, it is preferable to have a thermal resistance high enough for a simultaneous sintering process.

(Shape of Active Material)

Regarding a shape of an active material, an active material having a spherical shape, a scale shape (plate shape), an amorphous shape, a needle shape, or a spike shape may be used.

(Current Collector)

The conductive substance constituting the current collecting electrode of the lithium ion secondary battery of the present invention is preferably a material with high conductivity. For example, the conductive substance is preferably a metal or an alloy with a high oxidation resistance. The metal or the alloy with a high oxidation resistance here refers to a metal or an alloy having a conductivity of $1 \times 10^1$ S/cm or more after being sintered under ambient atmosphere. Specifically, for a metal, it is preferable to use silver, palladium, gold, platinum, or aluminum. For an alloy, an alloy made of two or more metals selected from silver, palladium, gold, platinum, copper, and aluminum is preferable. For example, AgPd is preferably used. AgPd is preferably mixed powder of Ag powder and Pd powder, or AgPd alloy powder.

In addition, the current collector may be produced by mixing a conductive material and an active material.

(Structure of Battery)

Figure 1:
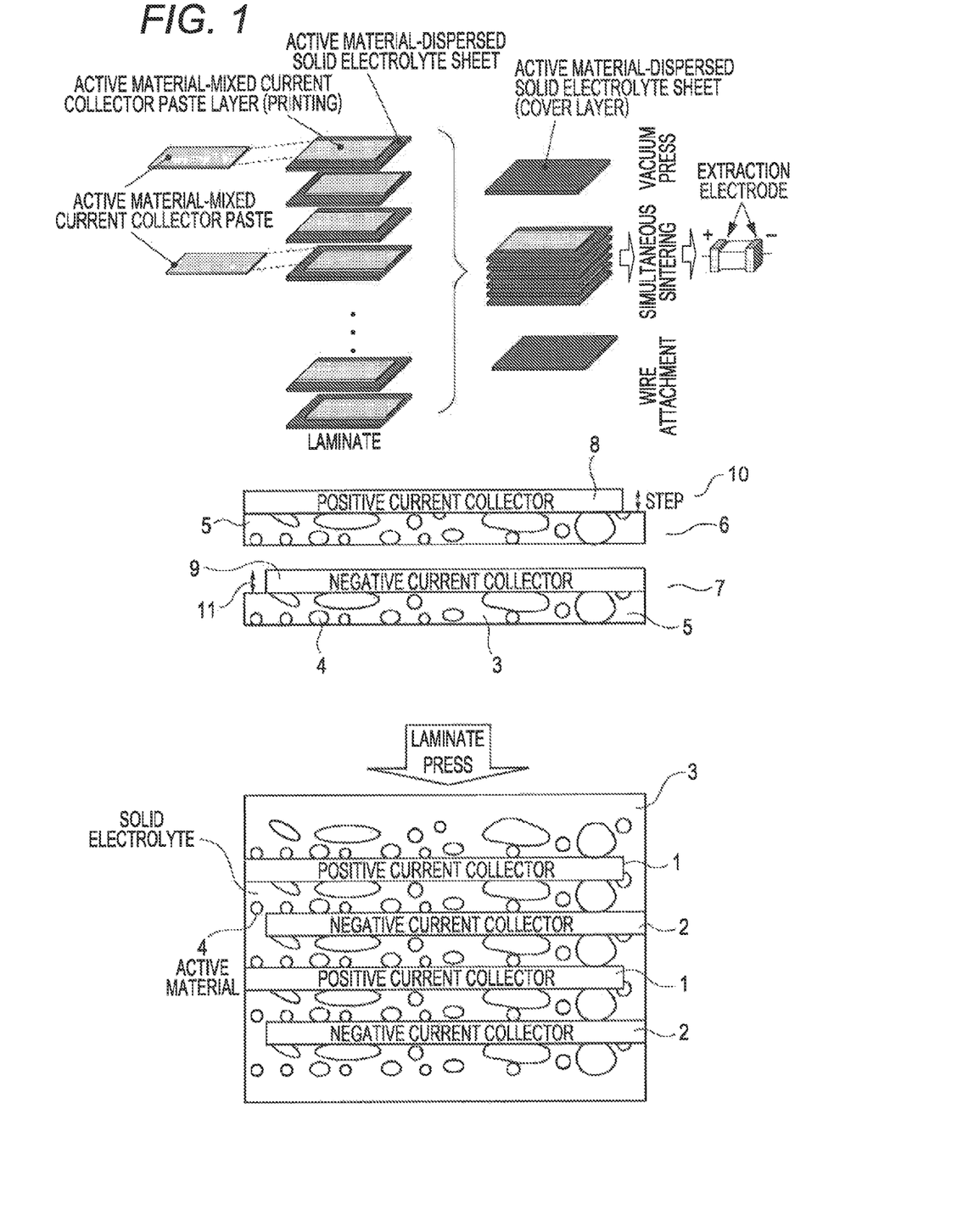
FIG. 1 is a conceptual diagram illustrating a structure of a secondary battery and a production process according to an embodiment of the present invention.

FIG. 1 is a conceptual sectional view illustrating a lithium ion secondary battery according to an embodiment of the present invention.

The lithium ion secondary battery of multilayer all-solid type is made of a laminated body, in which positive layers 1 made of a positive current collector and negative layers 2 made of a negative current collector are alternately laminated with solid electrolyte layers 3 interposed therebetween. In this lithium ion secondary battery, the solid electrolyte layer 3 includes an active material 4 in a matrix made of solid electrolyte, and the active material 4 is not continuous between the positive layer 1 and the negative layer 2.

(Method of Producing Battery)

An embodiment of a method of producing a battery will be described with reference to FIG. 1.

Firstly, a solid electrolyte sheet 5 that includes the active material 4 in the solid electrolyte is prepared.

Solid electrolyte powder and active material powder are dispersed into a vehicle including an organic solvent and a binder at the predetermined ratio to prepare a paste for a solid electrolyte layer.

The prepared paste is applied onto a substrate such as PET, and is dried as necessary. Then, the substrate is peeled to prepare the solid electrolyte sheet 5. A method of applying the paste is not particularly limited, and a known method of any one of screen printing, application, transfer, doctor blade, and the like may be used.

A positive unit 6 is prepared by applying a positive current collector paste onto this solid electrolyte sheet 5. In addition, similarly, the negative sheet 7 is prepared by applying a negative current collector paste 9 onto the solid electrolyte sheet.

A laminated body is prepared by laminating a plurality of positive sheets 6 and negative sheets 7.

The prepared laminated body is collectively pressure-bonded. The pressure-bonding is done with heating. The heating temperature is, for example, 40 to 90° C. The pressure-bonded laminated body is sintered by heating under ambient atmosphere for example. Here, sintering refers to a heating process for obtaining a sintered body. In other words, sintering refers to a phenomenon, in which an aggregate of solid powder is heated at the temperature lower than its melting point to solidify it to make a dense substance called a sintered body.

In production of the lithium ion secondary battery of the present invention, the sintering temperature is preferably 500 to 1100° C.

Because the solid electrolyte does not densely sinter at less than 500° C., ionic conductivity of the solid electrolyte is low.

If the temperature exceeds 1100° C., problems such as melting of the solid electrolyte and defamation of the laminated body occur. Furthermore, within this range, the range of 750 to 900° C. is preferable. Within the range of 750 to 900° C., a denser sintered body can be obtained, and ionic conductivity becomes high and internal impedance of the battery reduces, which are advantageous. When the sintering temperature is 500° C. to 600° C., it becomes possible to achieve sintering while a reaction of the solid electrolyte and the active material is restrained.

The heating rate in the sintering process is preferably 1 to 50° C./min. At least 1° C./min is preferable from a point of view of production efficiency. The yield improves by making the rate less than 50° C./min.

The retention time is preferably 1 to 240 min.

The solid electrolyte does not densely sinter in less than 1 min. For this reason, ionic conductivity of the solid electrolyte is low.

When the time exceeds 240 min, a large gap is generated in the sintered body due to excessive sintering, and a dense sintered body cannot be obtained.

The sintering atmosphere is preferably ambient atmosphere, a nitrogen atmosphere, or a mixed atmosphere of nitrogen and hydrogen.

The positive unit 6 is produced by printing the positive current collector paste onto the solid electrolyte sheet 5. At this time, a step 10 is provided at the end on the side opposite (right end of the drawing) to an end electrode connected to the positive current collector 8.

Similarly, the negative unit 7 is produced by printing the negative current collector 9 onto the solid electrolyte sheet 5. At this time, a step 11 is provided at the end face on the side opposite (left side of the drawing) to an end electrode connected to the negative current collector 9.

In the present invention, the height of this step is equal to the thickness of the positive current collector. Thus, the step 10 can be made smaller by making the thickness of the positive current collector thinner.

EXAMPLE

Hereinafter, examples of the present invention will be described.

In this example, an example, in which a lithium ion secondary battery having the structure of FIG. 1 and having a current collector made of only a conductive material was produced, is described. In this example, $Li_{3.5}Si_{0.5}P_{0.5}O_4$ (LSPO) was used as solid electrolyte, and $Li_2MnO_3$ (LMO) was used as an active material.

(Production of Active Material)

As a negative active material, LMO produced by the following method was used.

$Li_2CO_3$ and $MnCO_3$ as starting materials were weighed to be the molar ratio of 1:4. These materials were mixed using water as a dispersion medium in a wet manner in a ball mill for 16 hours, and the mixture was dehydrated. The obtained powder was calcined in the air at 800° C. for two hours. The calcined product was pulverized coarsely, and the pulverized product was mixed using water as a dispersion medium in a wet manner in a ball mill for 16 hours. Then, calcined powder of a positive active material was obtained by dehydration. The average particle size of this calcined powder was 0.30 µm. It was confirmed that the composition was $Li_2MnO_3$ (LMO) using an X-ray diffractometer.

In addition, the average particle size is a value calculated by image-analyzing a SEM picture as the circular equivalent diameter, and in this example, it was measured by two dimensional image analyzing software, WinRoof.

(Production of Solid Electrolyte Sheet)

As a raw material for solid electrolyte, powder of $Li_{3.5}Si_{0.5}P_{0.5}O_4$ (LSPO) produced by the following method was used. $Li_2CO_3$, $SiO_2$, and $Li_3PO_4$ that is commercially available as starting materials were weighed to be the molar ratio of 2:1:1. These materials were mixed using water as a dispersion medium in a wet manner in a ball mill for 16 hours. Then, the mixture was dehydrated. The obtained powder was calcined in the air at 950° C. for two hours. The calcined product was pulverized coarsely, and the pulverized product was mixed using water as a dispersion medium in a wet manner in a ball mill for 16 hours. Then, calcined powder of an ion conductive inorganic material was obtained by dehydration. The average particle size of this powder was 0.54 µm. It was confirmed that the composition was $Li_{3.5}Si_{0.5}P_{0.5}O_4$ (LSPO) using an X-ray diffractometer.

Subsequently, the calcined powder of the solid electrolyte material and the calcined powder of the active material were mixed to be the volume ratio of 100:0, 90:10, 85:15, 80; 20, 75:25, 70:30, 65:35, 60:40, and 55:45. Then, 100 parts by weight of this mixed powder, 100 parts by weight of ethanol, and 200 parts by weight of toluene were mixed in a wet manner in a ball mill. Then, 16 parts by weight of polyvinyl butyral binder and 4.8 parts by weight of benzyl butyl phthalate were further added and mixed to prepare a solid electrolyte paste. This solid electrolyte paste was formed into a sheet by a doctor blade method using a PET film as a substrate, and a solid electrolyte layer sheet having the thickness of 13 µm was obtained.

(Production of Current Collector Paste)

Ag/Pd having the weight ratio of 70/30 and $Li_2MnO_3$ powder were mixed to be the volume ratio of 60:40. 100 parts by weight of this powder, 10 parts of ethyl cellulose as a binder, and 50 parts of dihydroterpineol as a solvent were added, and kneaded and dispersed by a triple roll mil to produce a current collector paste. Here, for Ag/Pd having the weight ratio of 70/30, a mixture of Ag powder (average particle size of 0.3 µm) and Pd powder (average particle size of 0.1 µm) was used.

Using these pastes, an all-solid secondary battery was produced in the following manner.

(Production of Positive Unit)

A current collector paste was printed onto the above-described solid electrolyte sheet in the thickness of 5 µm by screen printing. At this time, one end face of the positive paste formed by application (left end of drawing) was made flush with one end face of the solid electrolyte sheet (left end of drawing), while the other end face (right end of drawing) was not made flush with the solid electrolyte sheet and a step was formed between them.

The printed current collector paste was dried at 80 to 100° C. for 5 to 10 minutes, and then a PET film was peeled off. In this manner, a sheet of a positive unit where a current collector paste was printed and dried on the solid electrolyte sheet was obtained.

(Production of Negative Unit)

A negative unit was produced by the same material and process as those for the positive unit. The only difference from the positive unit is that the location of the step is on the side opposite to that of the positive unit.

(Production of Laminated Body)

A plurality of positive units and a plurality of negative units were prepared. In this example, two positive units and two negative units were prepared.

Positive sheets and negative sheets were alternately laminated so that the positive current collector and the negative current collector sandwich a solid electrolyte sheet.

At this time, by laminating the positive unit and the negative unit so as to be displaced from each other, the current collector paste layer of the positive unit was extended to only one end face, and the current collector paste layer of the negative unit was extended to only the other face. Then, this was formed at 80° C. under a pressure of 1000 kgf/cm² [98 MPa], and was subsequently cut to form a laminated block.

Then, a laminated body was obtained by simultaneously sintering the laminated block. The simultaneous sintering was performed in the air in a condition in which the temperature was raised up to 1000° C. at a heating rate of 200° C./hour, and the temperature was held at 1000° C. for two hours. 3 µm, The thickness of the negative current collector layer was 3 µm.

(Formation of Extraction Electrode)

An all-solid lithium ion secondary battery was obtained in such a manner that an extraction electrode paste was applied on the end face of the laminated body, then it was sintered at 800° C. to form a pair of extraction electrodes.

(Evaluation of Battery Properties)

A lead wire was attached to each extraction electrodes connected to the positive current collector and the negative current collector, and the capacity and the internal resistance of the battery were measured. The measurement was carried out under the current upon charging and discharging of 0.3 µA. In addition, the cut off voltage upon charging and discharging was set to be 4.0 V and 0.5 V, respectively.

(Occurrence of Peeling and Cracking During Sintering Process)

The appearance of the laminated body after sintering was observed by a microscope to investigate a rate of occurrence of peeling or cracking (Measurement Results)

Discharge Capacity

Figure 2:
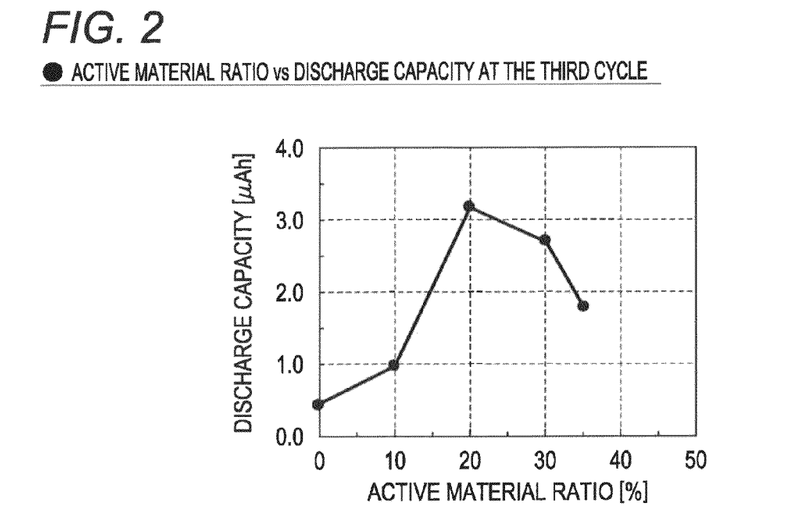
FIG. 2 is a graph showing changes in a discharge capacity when the volume ratio of an active material is changed.

The result of measurement of the discharge capacity at the third cycle in Example 1 is shown in FIG. 2.

As shown in FIG. 2, the discharge capacity increased as the volume ratio of the active material increases. However, when the ratio exceeds 65:35, a short circuit occurred. Note that, a short circuit occurred because active materials dispersed in the solid electrolyte communicated each other between the positive current collector and the negative current collector.

Figure 3:
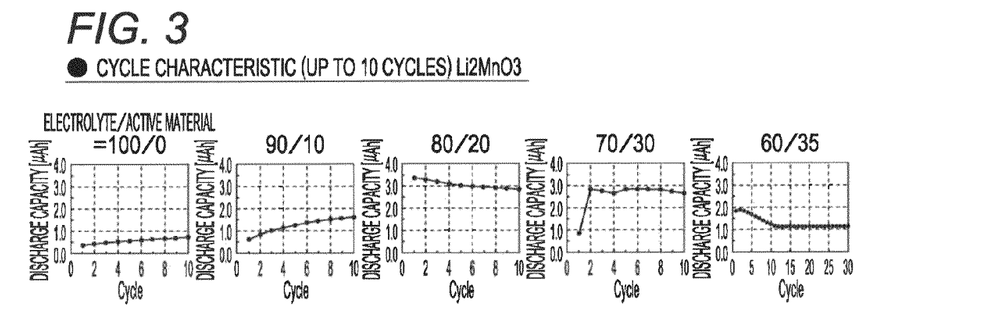
FIG. 3 is a graph showing changes in a discharge capacity with respect to the number of discharge cycles.

The result of measurement of changes in the discharge capacity with respect to the number of cycles of the Example 1 is shown in FIG. 3.

At solid electrolyte: active material=100:0 in Example 1, an increase of a capacity, which seems to be attributed to the contact state of the interface, is seen. In contrast, at 90:10 to 65:35 where the active material was dispersed in the solid electrolyte, the discharge capacity is high from the beginning, and stable.

Internal Resistance (IR)

Figure 4:
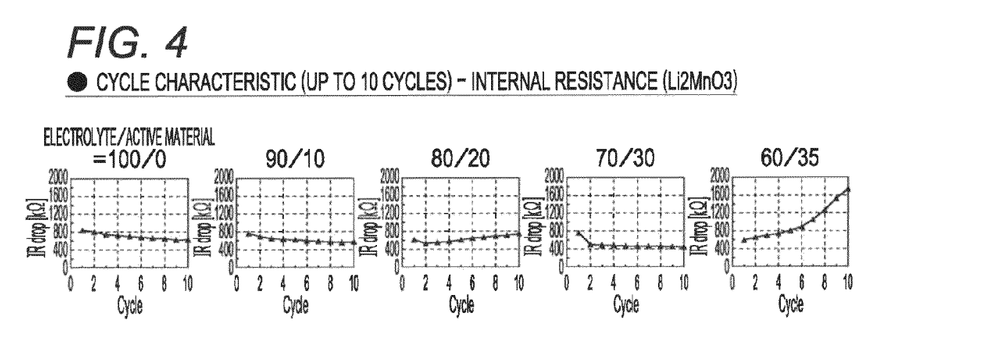
FIG. 4 is a graph showing changes in an internal resistance with respect to the number of discharge cycles.
Figure 5:
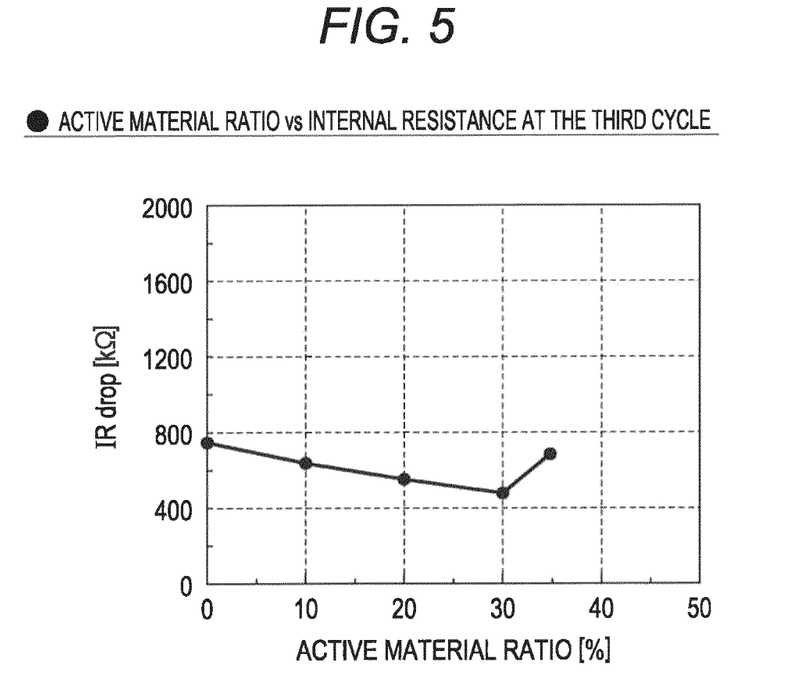
FIG. 5. is a graph showing changes in an internal resistance when the volume ratio of an active material is changed.

The result of measurement of changes in the internal resistance with respect to the number of cycles of Example 1 is shown in FIG. 4. Here, the internal resistance value was calculated from the voltage reduction at the time of discharging.

As shown in FIG. 4, at solid electrolyte: active material=100:0 in the Example 1, a reduction of the internal resistance, which seems to be attributed to the contact state of the interface, is seen. In contrast, in a battery with 90:10 to 65:35 where the active material was dispersed in the solid electrolyte, the internal resistance does not substantially change.

Short circuit incidence (%)

| Solid electrolyte/ active material | Example 1 |
| --- | --- |
| 100/0 | 0% |
| 90/10 | 0% |
| 85/15 | 0% |
| 80/20 | 0% |
| 75/25 | 0% |
| 70/30 | 0% |
| 65/35 | 0% |
| 60/40 | 100% |
| 55/45 | 100% |

In Example 1, the short circuit incidence was 0% when solid electrolyte/active material was 100/0 to 65/35, and was 100% when solid electrolyte/active material was 60/40 or more. That is, within the scope of the present invention, batteries can be produced at a good yield.

Incidence (%) of peeling and cracking.

| Solid electrolyte/ active material | Example 1 |
| --- | --- |
| 100:0 | 10% |
| 90:10 | 0% |
| 85:15 | 0% |
| 80:20 | 0% |
| 75:25 | 0% |
| 70:30 | 0% |
| 65:35 | 0% |
| 60:40 | 0% |
| 55:45 | 0% |

In Example 1, the incidence of peeling and cracking was 10% when solid electrolyte/active material was 100/0, and was 0% when solid electrolyte/active material was 90/10 or more. That is, within the scope of the present invention, batteries can be produced at a good yield.

As discussed above, the lithium ion secondary battery and the method of producing the same according to the present invention is effective in reducing the internal resistance of the lithium ion secondary battery and in improving charge and discharge cycle characteristics. In particular, the present invention greatly contributes in the field of electronics by providing a battery of high performance and small size but large capacity.

In addition, the all-solid secondary battery of the present invention is suitable for a battery for a portable device, a built-in battery for an IC card, a battery for an implant medical device, a battery implemented on the surface of a substrate, and a solar battery and other batteries used in combination with other batteries (battery for a hybrid power source).

The invention claimed is:

1. A lithium ion secondary battery which is a multilayer all solid state battery comprising: first and second external layers and an intervening laminate structure, the laminate structure consisting of positive units and negative units stacked alternately with each one positive unit having a first surface and an opposite second surface and each one negative unit having a third surface and an opposite fourth surface;

wherein each abutment between one of the positive units and one of the negative units among the stacked positive units and negative units consists of either an abutment between said first surface and said fourth surface or between said second surface and said third surface;

wherein each one positive unit in said laminate structure is a solid state unit consisting of a positive current collector layer at said first surface and a third layer, said third layer consisting of a solid electrolyte, and active material in a configuration in which the active material is dispersed throughout the third layer to form a first matrix of solid electrolyte and active material spanning an entire thickness of the third layer, in which at any level relative to a thickness direction of the third layer there occurs both solid electrolyte and active material;

wherein the active material in the first matrix is discontinuous in the thickness direction between the positive current collector layer and said second surface and wherein the active material of said first matrix occurs at both the second surface and in contact with said positive current collector layer;

wherein each one negative unit in said laminate structure is a solid state unit consisting of a negative current collector layer at said third surface and a fourth layer, said fourth layer consisting of a solid electrolyte and active material in a configuration in which the active material is dispersed throughout the fourth layer to form a second matrix of solid electrolyte and active material spanning an entire thickness of the fourth layer, in which at any level relative to a thickness direction of the fourth layer there occurs both solid electrolyte and active material;

wherein the active material in the second matrix is discontinuous in the thickness direction of the fourth layer between the negative current collector layer and said fourth surface and wherein the active material of said second matrix occurs at both the fourth surface and in contact with said negative current collector layer;

wherein said active material has an electro-chemical structure that is electrically conductive, and comprises lithium and a base metal;

wherein said active material has a lithium ion dispersing path capable of providing lithium ion releasing during use;

wherein said active material has a site for absorbing lithium ions capable of providing lithium ion absorption during use; and wherein said active material has a valence that differs from an average valence of the base metal.

2. The lithium ion secondary battery according to claim 1, wherein the active material is any one of $Li_2MnO_3$, $LiMn_2O_4$, and $LiV_2O_4$.

3. The lithium ion secondary battery according to claim 1, wherein the solid electrolyte is at least one material selected from the group consisting of lithium silicophosphate ($Li_{3.5}Si_{0.5}P_{0.5}O_4$), lithium titanium phosphate ($LiTi_2(PO_4)_2$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B_2O_3$, and $Li_2O$—$GeO_2$.

4. The lithium ion secondary battery according to claim 1, wherein the solid electrolyte is a polyanion compound, including lithium oxide or lithium, which is free of a polyvalent transition element.

5. The lithium ion secondary battery according to claim 1, wherein the solid electrolyte layer is free of a reaction product between the solid electrolyte and the active material.

6. The lithium ion secondary battery according to claim 1, wherein a thickness of each of the positive current collector and the negative current collector is 0.2 μm to 30 μm.

7. The lithium ion secondary battery according to claim 1, wherein a ratio of an area of the solid electrolyte to an area of the active material in a cross-section of the solid electrolyte layer is 90:10 to 65:35.

\* \* \* \* \*